United States Patent [19]
Lee

[11] Patent Number: 5,701,284
[45] Date of Patent: Dec. 23, 1997

[54] DISK ROTATION CONTROL APPARATUS AND METHOD

[75] Inventor: Dong-Jin Lee, Kwanmyeong, Rep. of Korea

[73] Assignee: Samsung Electronics Co., Ltd., Kyungki-Do, Rep. of Korea

[21] Appl. No.: 492,713

[22] Filed: Jun. 20, 1995

[30] Foreign Application Priority Data

Jun. 22, 1994 [KR] Rep. of Korea ............ 14361/1994

[51] Int. Cl.⁶ .................................. G11B 19/20
[52] U.S. Cl. .......... 369/50; 360/73.03; 360/74.1; 369/60
[58] Field of Search .............. 360/73.03, 74.1, 360/78.13, 38.1; 369/44.28, 50, 60, 53, 54, 268; 386/47, 51; 318/275

[56] References Cited

U.S. PATENT DOCUMENTS

| | | | |
|---|---|---|---|
| 4,236,050 | 11/1980 | Winslow | 360/73.03 |
| 4,779,260 | 10/1988 | Koneko | 360/74.1 |
| 5,109,370 | 4/1992 | Muramatsu | 369/60 |
| 5,204,593 | 4/1993 | Ueki | 318/254 |
| 5,270,992 | 12/1993 | Yasuda | 369/50 |
| 5,285,141 | 2/1994 | Hwang | 360/73.03 |
| 5,381,279 | 1/1995 | Dunn | 360/73.03 |
| 5,432,766 | 7/1995 | Ando | 360/73.03 |
| 5,473,230 | 12/1995 | Dunn | 360/73.03 |

FOREIGN PATENT DOCUMENTS 217558  10/1985  Japan .................. 360/73.03

OTHER PUBLICATIONS

United Kingdom Official Search Report, no date.

Primary Examiner—Aristotelis M. Psitos
Assistant Examiner—Alan Faber
Attorney, Agent, or Firm—Sughrue,Mion,Zinn,Macpeak & Seas, PLLC

[57] ABSTRACT

An apparatus and method for rapidly controlling the disk rotation by detecting a high speed rotation and a reverse rotation of a disk. The disk driving apparatus for controlling rotation of a disk in a normal mode includes a spindle motor for driving the rotation of the disk by a spindle control signal and for generating a spindle driving voltage as the disk rotates, a servo control for generating the spindle control signal of the spindle motor by a servo control signal, a device for converting the spindle driving voltage into digital data, a device for storing a rotation range data table of the spindle driving voltage corresponding to ah abnormal rotation of the disk, and a controller for comparing and analyzing the converted digital data with the rotation range data table, sensing normal and abnormal states, and generating the servo control signal from the sensed results. Upon sensing an abnormal state the controller generates the servo control signal applying a reverse torque to a rotation direction of the spindle motor during a predetermined time, and sequentially performs a stop mode and a normal driving mode.

9 Claims, 4 Drawing Sheets

DISK ROTATION CONTROL APPARATUS AND METHOD

BACKGROUND OF THE INVENTION

The present invention relates to an apparatus and method for controlling disk rotation and more particularly to an apparatus and method for rapidly controlling the disk rotation by detecting a high speed disk rotation and a reverse disk rotation.

It is well known that three types of compact disk are currently in use. One type of compact disk is used in audio appliances, another type in video appliances, and the third type is used as an auxiliary memory device. Hereinafter, a compact disk is referred to as a "CD". In the above-mentioned CD appliances, data on the disk can be recorded and then the recorded data can be reproduced while disk rotation is appropriately controlled.

FIG. 1 is a flowchart illustrating a control method of disk rotation of a conventional disk driving apparatus. In the figure, a disk is first rotated by acceleration driving a spindle motor. From a time when the disk rotation is stabilized to a time when the disk rotation is stopped, the disk rotation is controlled by a normal mode. In other words, there are shown a spindle motor kick mode for rotating the disk from a stopped state upon initial driving of the disk, a rough servo for controlling a rough rotation of the disk, and a continuous linear velocity CLV mode (hereinafter referred to as CLV mode) for performing rotation control of the disk by a phase and velocity control mode when a phase lock is in a locking state. But when the phase lock is in an unlocking state, the rotation control of the disk is performed by the rough servo which applies a brake mode for rotating the disk reversely, and a stop mode for stopping the disk rotation.

In the case of starting an initial play mode, a disk driving apparatus requires a great amount of torque for rotating the disk from a stopped state. In this case, a controller of the disk driving apparatus has to strongly rotate the spindle motor in a forward direction. As illustrated in FIG. 1, the controller of the disk driving apparatus executes an acceleration mode at a step 102 where disk rotation is started. Then, as the disk rotates, the controller performs a rough servo for roughly controlling the disk rotation at a step 104, since the disk is in a transition state at which an accurate phase lock is not executed. The phase lock is executed by the rough servo, and the CLV mode is executed to automatically perform control of the disk rotation by the rough servo at a step 106.

The control of a stabilized rotation of the disk is performed during the CLV mode, and either the phase and velocity control mode is performed at step 110 or the rough servo is performed at step 114, depending upon the locking/unlocking state of the phase lock.

If during the CLV mode performing state a stop key is pressed, at a step 116 a brake mode is implemented to stop the disk rotation, which mode applies a reverse torque to the spindle motor. And if the disk rotation is almost stopped, at a step 118 a stop mode is implemented, by which no torque is applied to the spindle motor.

However, the conventional disk rotation control method as shown in FIG. 1, has a disadvantage in that if the disk is changed from a normal rotation state to a reverse or high speed rotation state, it is difficult for the disk to again return to the normal rotation state since the phase lock is performed in a reverse direction of the disk rotation. In addition, under the condition described above, if the controller of the disk driving apparatus performs a general stop mode, the phase lock time is quite long and the disk rotation is not effectively controlled, thereby having a serious affect on the overall performance of the system.

SUMMARY OF THE INVENTION

Therefore, an object of the present invention is to provide an apparatus and method for analyzing a driving voltage of a spindle motor during a normal mode in a disk driving apparatus, thus recognizing the existence or nonexistence of an abnormal mode.

Another object of the present invention is to provide an apparatus and method for rapidly setting a normal rotation condition by controlling disk rotation when an abnormal mode is detected upon performance of a normal mode in a disk driving apparatus.

Still another object of the present invention is to provide an apparatus and method for sequentially performing a brake mode, a stop mode, and a normal mode, when a disk rotates at a high speed, by analyzing an abnormal condition in a disk driving apparatus, and for sequentially performing an acceleration mode, a stop mode, and a normal mode, when the disk rotates reversely, thus enabling the disk rotation to rapidly return to the normal mode.

To achieve these and other objects, there is provided a disk driving apparatus which includes a spindle motor for controlling disk rotation, a servo controller for controlling driving of the spindle motor, an analog/digital converter for converting a driving voltage of the spindle motor into a digital data, an analysis table in which the relation between the driving voltage of the spindle motor and a rotation condition of a disk is analyzed, and a controller for analyzing the digital data received in a normal mode state and, if the analyzed result is determined as an abnormal condition, for outputting a signal for controlling driving of the spindle motor to the servo controller. In the meanwhile, the controller sequentially performs a brake mode, a stop mode, an initial driving mode, and a normal mode, under the abnormal condition that the disk rotates at a high speed, by analyzing the abnormal condition in a disk driving apparatus, and to the contrary, sequentially performs an acceleration mode, stop mode, initial driving mode, and normal mode, under another abnormal condition that the disk rotates reversely, thus enabling the disk rotation to rapidly return to the normal mode state from the abnormal state.

BRIEF DESCRIPTION OF THE DRAWINGS

The following is a detailed description of this invention by the reference of the attached drawings, in which like numbers indicate the same or similar elements.

DETAILED DESCRIPTION OF THE PREFERRED EMBODIMENTS

In the following description, numerous specific details, such as a driving voltage value of spindle motor and so on, are set forth in order to provide a thorough understanding of the present invention. It will be understood by those skilled in the art that other embodiments of the present invention may be practiced without these specific details, or with alternative specific details.

The term "disk" as used herein refers to any disk for recording and reproducing digital data. The term "normal mode" is used to describe the CLV mode which controls a constant speed rotation of the disk, such as a play mode.

Figure 1:
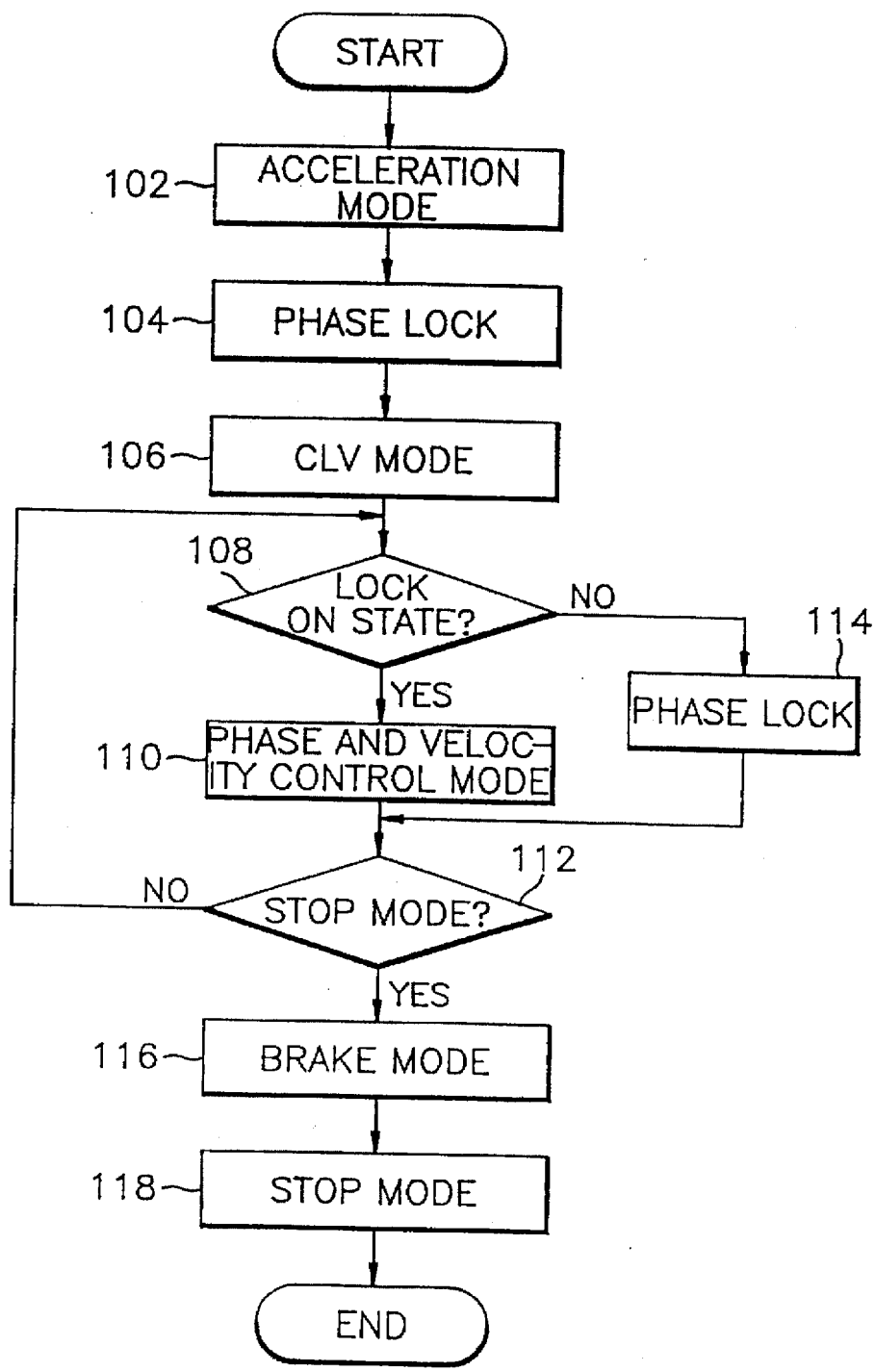
FIG. 1 is a flowchart illustrating control of disk rotation of a conventional disk driving apparatus.
Figure 2:
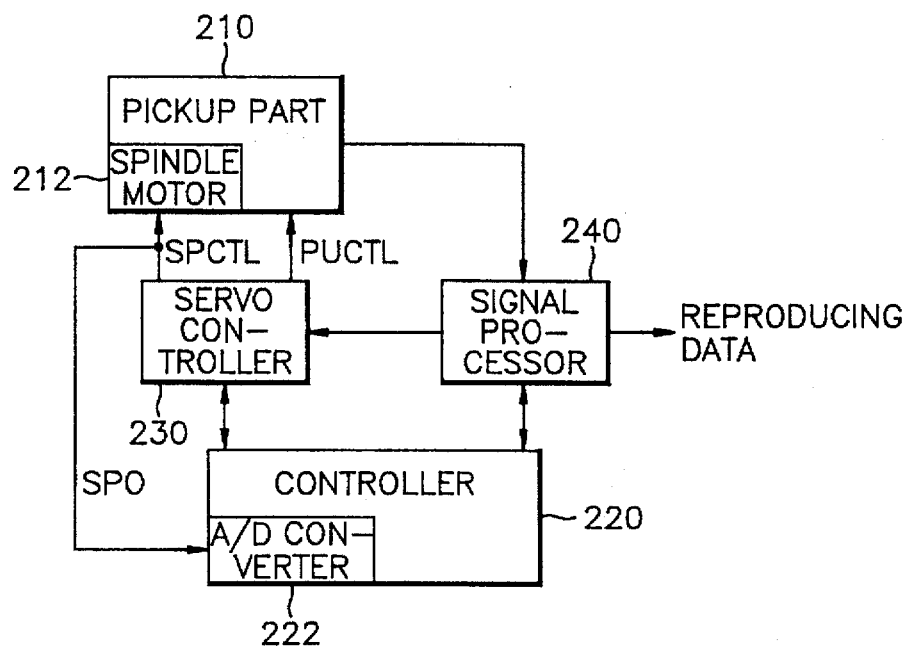
FIG. 2 is a block diagram illustrating a configuration of an embodiment of a disk rotation control apparatus according to the present invention.

FIG. 2 is a block diagram illustrating a configuration of an embodiment of a disk rotation control apparatus according to the present invention. In the configuration, a pickup part 210 and a spindle motor 212 have functions of controlling an operation of a disk. The pickup part 210 records digital data on and reads the recorded data from the disk. The spindle motor 212 serves to control the disk rotation. A servo controller 230 serves to control the operations of the pickup part 210 and spindle motor 212. The servo controller 230 outputs a pickup control signal and performs a focusing servo and tracking servo for accurately recording and reproducing the data on the disk by the pickup part 210. Further, the servo controller 230 outputs a spindle control signal SPCTL and thus controls the operation of the spindle motor 212, thus enabling the disk to be accurately rotated. A signal processor 240 applies a recording signal to the pickup part 210 or processes a reproducing signal read out from the pickup part 210. During a recording mode, the signal processor 240 acts as a digital signal processor and compresses and encodes the recording data, and converts the encoded data into data having a recording format. In the meanwhile, during a reproducing mode, the signal processor 240 corrects error data, and decodes and expands the corrected data, thus reproducing the original data. A controller 220 has an analog/digital converter 222 in an interior thereof, but converter 222 can be separately installed in the exterior thereof. Here, the A/D converter 222 converts a driving voltage SPO of the spindle motor 222 outputted from the spindle motor 212 into digital data. The controller 220 controls operations of the servo controller 230 and the signal processor 240 in accordance with a predetermined mode and thus processes the overall operation of the disk driving apparatus. In addition, in an internal memory thereof, the controller 220 has a rotation/voltage table in which values of rotation modes of the disk corresponding to the driving voltage SPO of the spindle motor 212 are stored. As a result, the controller 220 analyzes a relationship between the digital converted data and the table during a normal mode, and from the analysis result, recognizes the existence or nonexistence of an abnormal rotation of the disk. At this time, if abnormal rotation is recognized, the controller 220 outputs control data corresponding to the respective related condition to the servo controller 230, thus enabling the disk to rapidly return to the normal rotation state from the abnormal rotation state.

Figure 4:
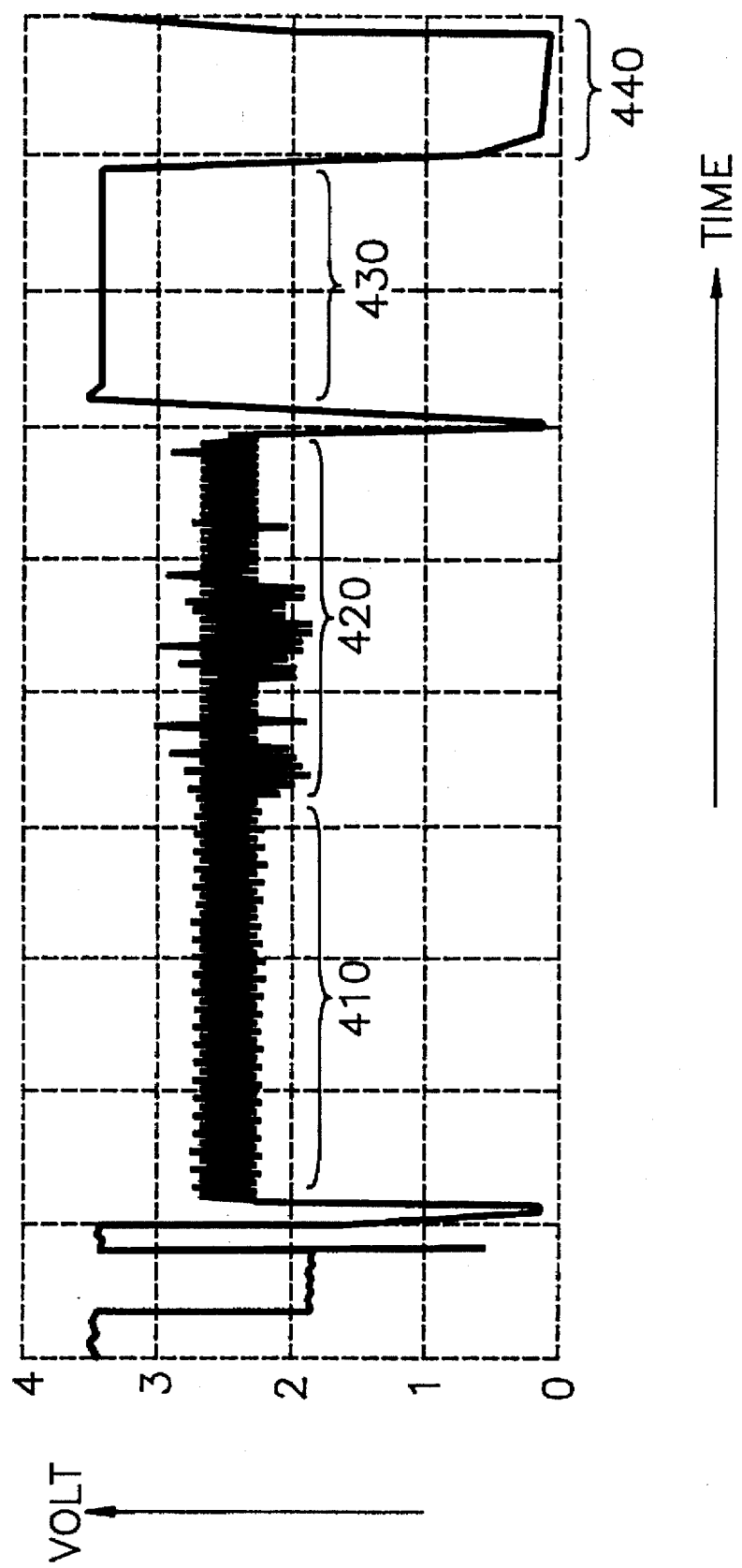
FIG. 4 is a waveform illustrating a driving voltage of a spindle motor of a disk rotation control apparatus according to the present invention.

FIG. 4 is a waveform illustrating a driving voltage SPO of the spindle motor 212 of a disk rotation control apparatus according to the present invention. It is shown that values of the driving voltages are changed in dependence upon each corresponding state. In the figure, the driving voltage SPO of the spindle motor ranges between 0 V–3.5 V. At a normal rotation mode, the driving voltage SPO has an intermediate voltage value as designated by reference numeral 410, and at a high speed forward rotation mode, the driving voltage SPO has a value approximating 3.5 V as designated by reference numeral 430. Further, at a reverse rotation mode, the driving voltage SPO has a value approximating 0 V as designated by reference numeral 440.

Figure 5:
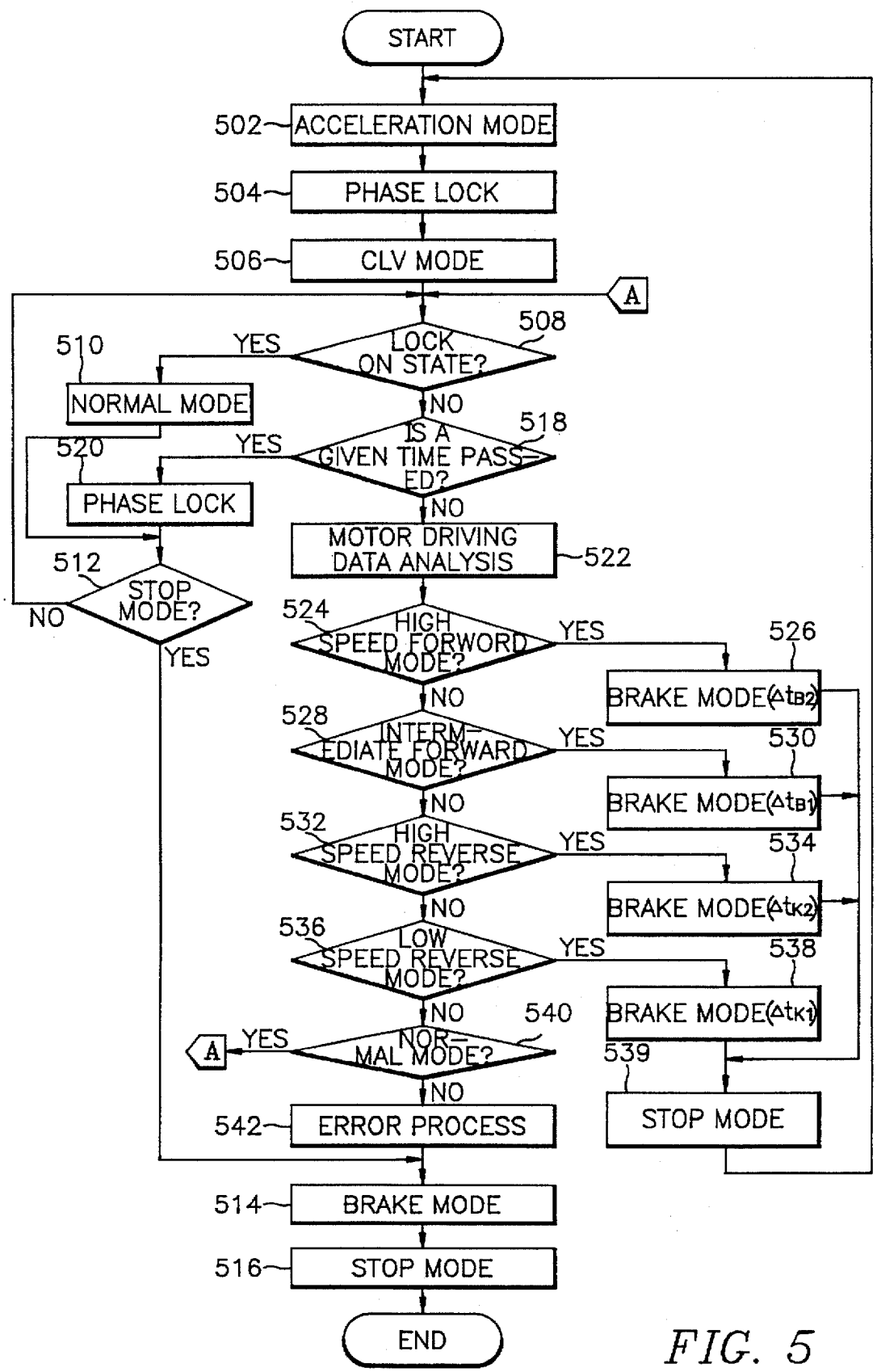
FIG. 5 is a flowchart illustrating control of disk rotation of a disk driving apparatus according to the present invention.

FIG. 5 is a flowchart illustrating control of disk rotation of a disk driving apparatus according to the present invention. A method for controlling operations of FIG. 5 comprises the steps of reading the driving voltage SPO of the spindle motor during the normal mode, comparing the driving voltage SPO to values of the analysis table to determine a rotation mode of the disk, outputting a brake voltage of the spindle motor corresponding to an abnormal condition upon determination of the abnormal rotation condition, and re-executing an initial driving mode after performance of the stop mode.

Returning back to FIG. 2, an embodiment constructed according to the principles of the present invention will be described in detail. The controller 220 has the A/D converter 222 for converting the driving voltage SPO of the spindle motor into the digital data, and a memory device for storing the analysis table. Also, the controller 220 controls all operations of the disk driving apparatus. In this case, the disk control state is generally divided into normal and abnormal states. That is, in the normal mode the controller 220 controls the driving of the spindle motor 212 in the same manner as a conventional driving method. However, in the case that the disk rotates at a high speed or reversely to the normal mode where a mode converting signal from an external system is not received, the controller 220 performs during a predetermined time the brake mode or acceleration mode for returning to the normal state from the abnormal state, and then provides a locking condition to re-execute the stop mode and the initial driving mode.

When a control signal for performing the normal mode is generated from the external system, the controller 220 recognizes the control signal and informs the servo controller 230 of the control signal. The servo controller 230 outputs the spindle control signal SPCTL for rotating the spindle motor 212 at a normal speed mode. Then, the spindle motor 212 rotates the disk by the outputted spindle control signal SPCTL. The A/D converter 222 receives the driving voltage SPO of the spindle motor 212 and converts the driving voltage to digital data. Here, the driving voltage SPO means a voltage necessary for rotating the disk by the spindle motor 212. The controller 220 receives the converted digital data, compares the data with information of the analysis table stored in the internal memory thereof, and analyzes whether the disk is normally rotated. If the analysis result has any voltage value in a normal range, the controller 220 outputs the control signal for performing the normal mode to the servo controller 230. However, if the analysis result has a voltage value in an abnormal range, the controller 220 analyzes the generated abnormal condition and outputs a control signal corresponding to the abnormal condition to the servo controller 230.

As shown in FIG. 4, when the driving voltage SPO of the spindle motor has any value between 0 V–3.5 V, it is assumed that the A/D converter 222 performs an A/D converting function of 8 bits, and that rotation range of the disk is classified into a high speed reverse rotation, low speed reverse rotation, ordinary rotation, intermediate forward rotation and high speed forward rotation. The relation between the disk rotation and each rotation range is variable depending upon the characteristic of the spindle motor 212, the driving voltage SPO of the spindle motor 212, and the resolution of the A/D converter 222. Hence, the values of the analysis table showing the relation between the disk rotation and each rotation range can be set differently for different arrangements. After the values described above are set, the following disk rotation/range Table 1 can be obtained from the operations results of the ranges mentioned above.

TABLE 1

| DIVISION | HIGH SPEED REVERSE ROTATION | LOW SPEED REVERSE ROTATION |
|---|---|---|
| VOLTAGE | 0 V–0.7 V | 0.8 V–1.9 V |
| SPO HEX | | |
| 0 | 0 1 2 3 | 4 5 6 7 |
| 1 | 00 10 20 30 | 8 |
| 2 | | 40 50 60 70 |
| . | 01 11 21 31 | 80 |
| . | 02 12 22 32 | 41 51 61 71 |
| . | . | 81 |
| D | | 42 52 62 72 |
| E | . | 82 |
| F | 0D 1D 2D 3D | . |
| | 0E 1E 2E 3E | |
| | 0F 1F 2F 3F | 4D 5D 6D 7D |
| | | 8D |
| | | 4E 5E 6E 7E |
| | | 8E |
| | | 4F 5F 6F 7F |
| | | 8F |

| DIVISION | NORMAL ROTATION | INTERMEDIATE FORWARD ROTATION | HIGH SPEED FORWARD ROTATION |
|---|---|---|---|
| VOLTAGE | 2.0 V– | 2.6 V– | 2.9 V– |
| SPO | 2.5 V | 2.8 V | 3.5 V |
| HEX | | | |
| 0 | 9 A B | C | D E F |
| 1 | | C0 | D0 E0 |
| 2 | 90 A0 | C1 | F0 |
| . | B0 | C2 | D1 E1 |
| . | 91 A1 | . | F1 |
| . | B1 | . | D2 E2 |
| D | 92 A2 | . | F2 |
| E | B2 | CD | . |
| F | . | CE | . |
| | . | CF | . |
| | | | DD ED |
| | 9D AD | | FD |
| | BD | | DE EE |
| | 9E AE | | FE |
| | BE | | DF EF |
| | 9F AF | | FF |
| | BF | | |

After sensing the disk rotation state from the Table 1, the disk rotation is controlled in accordance with each mode. Here, the control for the each range is established experimentally, as follows:

A. General CLV range in the normal mode: a phase lock as a common control state is performed.

B. High speed forward rotation range: reverse brake time is set as $\Delta t_{B2}$, and the brake mode and stop mode are sequentially performed.

C. Intermediate forward rotation range: reverse brake time is set as $\Delta t_{B1}$, and the brake mode and stop mode are sequentially performed.

D. High speed reverse rotation range: forward kick time is set as $\Delta t_{K2}$, and the brake mode and stop mode are sequentially performed.

E. Low reverse rotation range: forward kick time is set as $\Delta t_{K1}$, and the brake mode and stop mode are sequentially performed.

Here, $\Delta t_B$ is the brake time of the spindle motor 212, in which $\Delta t_{B2}$ is set to be longer than $\Delta t_{B1}$. Further, $\Delta t_k$ is the kick time of the spindle motor 212, in which $\Delta t_{K2}$ is set to be longer than $\Delta t_{K1}$. In the present invention, the brake and kick time of the high speed range is set twice as long as that of the low speed and intermediate speed ranges. During the brake time, the brake mode is performed, while during the kick time, the forward torque is applied by the spindle motor, thus enabling the phase lock to be rapidly locked.

Referring to FIG. 5 showing the control processes of the disk rotation by determining a current disk rotation state from the digital converted data, in the case when the normal mode is initially performed, the controller 220 performs the acceleration mode at step 502 for rotating the disk from at a stopped state, thereby enabling the servo controller 230 to strongly rotate the spindle motor 212 forwardly. Then, when the disk starts to rotate, the controller 220 performs a rough servo because an accurate phase lock is not executed. When the phase lock is executed at step 504, control goes to step 506, and the controller 220 performs the CLV mode in which the rotation control of the disk is automatically executed by the rough servo. This process is performed from the state where the disk does not rotate to the state where the phase lock is locked to the initial driving process implementing the normal mode.

As set forth, when the phase lock is locked in the normal mode, the controller 220 performs operations of steps 508–512, thereby controlling the disk rotation. In this case, the driving voltage SPO of the spindle motor maintains a constant voltage of the stable portion 410 as shown in FIG. 4. At this time, the driving voltage SPO of the spindle motor has a voltage of the normal rotation range as shown in Table 1. On the other hand, if the stop command is issued from the exterior of the system during the normal mode, the controller 220 recognizes the stop command at step 512, applies reverse torque to the forwardly rotating spindle motor 212, and then performs the brake mode at step 514. The controller performs, after a predetermined time, the stop mode at step 516, thus stopping the driving of the spindle motor 212.

However, in the normal mode state if the phase lock is in a shaky locking state, as shown in the unstable portion 420 of FIG. 4, the controller 220 analyzes the state of the phase lock during a predetermined time at step 518. That is, the locking state is checked during a predetermined time and, if the predetermined time has not passed, the controller 220 performs the phase lock at step 520 and returns to step 508. If the phase lock is not locked at the end of the predetermined time (that is, if the time of unstable portion 420 is longer than the predetermined time), the controller 220 analyzes the driving voltage SPO of the spindle motor from the output of the A/D converter 222.

On the other hand, in the abnormal mode the driving voltage SPO of the spindle motor has voltages corresponding to the high speed forward rotation range, reverse rotation range, or the normal range. In the case where the abnormal mode is analyzed as either high speed forward rotation or reverse rotation, an abnormal condition is considered to exist. Hence, the controller 220 performs the acceleration mode or brake mode, stop mode and initial driving mode, sequentially. In the case where one of these abnormal states occurs, control of the disk is not possible at the ordinary speed of the normal mode. To solve this problem, in the present invention, the controller 220 performs the acceleration mode or brake mode in accordance with the abnormal conditions and enables the phase lock to be rapidly locked. This stops the disk rotation and then causes rotation of the disk.

The first of the abnormal conditions to be considered is the case where the abnormal condition corresponds to the high speed forward rotation range and the controller 220 performs the brake mode at steps 524–530. In the present invention, the abnormal condition is divided into the high speed forward rotation range and intermediate forward rotation range. Accordingly, when a driving voltage SPO of the spindle motor in the high speed forward rotation range such as the reference numeral 430 is received, the controller 220 performs the brake mode during the time $\Delta t_{B2}$ at step 526. As a result, reverse torque is applied to the spindle motor 212 during the time $\Delta t_{B2}$, thereby achieving the brake of the spindle motor 212. Then, when the brake mode is completed, the controller 220 performs the stop mode at step 539 and returns to the initial driving mode of step 502. On the other hand, in case of receiving the driving voltage SPO of the spindle motor in the intermediate forward range, the controller 220 performs the brake mode during the time $\Delta t_{B1}$ at step 530. As a result, reverse torque is applied to the spindle motor 212 during the time $\Delta t_{B1}$, thereby achieving the brake of the spindle motor 212. Then, when the brake mode is completed, the controller 220 performs the stop mode at step 539 and returns to the initial driving mode of step 502.

The second condition to be considered is the case where the abnormal condition corresponds to the reverse rotation range. In that case, the controller 220 performs the acceleration mode at steps 532–538. In the present invention, the abnormal condition is divided into the high speed reverse rotation range and low speed reverse rotation range. Accordingly, in case of receiving such a driving voltage SPO of the spindle motor in the high speed reverse rotation range as the reference numeral 440, the controller 220 performs the brake mode during the time $\Delta t_{K2}$ at step 534. As a result, the forward torque is applied to the spindle motor 212 currently executing the high speed reverse rotation during the time $\Delta t_{K2}$, thereby achieving the braking of the spindle motor 212. Then, when the braking mode is completed, the controller 220 performs the stop mode at step 539 and returns to the initial driving mode of step 502. On the other hand, in case of receiving the driving voltage SPO of the spindle motor in the low speed reverse range, the controller 220 performs the brake mode during the time $\Delta t_{K1}$ at step 538. As a result, forward torque is applied to the spindle motor 212 during the time $\Delta t_{K1}$, thereby achieving the braking of the spindle motor 212. Then, when the brake mode is completed, the controller 220 performs the stop mode at step 539 and returns to the initial driving mode of step 502.

As a third condition, in case of receiving the driving voltage SPO of the spindle motor in the normal rotation range, separate steps are not processed and the controller 220 returns to step 508 and attempts a phase lock. If an unlocking state of the phase lock extending over the predetermined time corresponds to the aforementioned first to third conditions, the controller 220 processes an error at step 542 and proceeds to step 514.

In the disk driving apparatus, when in the normal mode state if the abnormal disk rotation conditions of high speed forward rotation and reverse rotation are detected, the controller 220 performs the brake mode or the acceleration mode in accordance with the corresponding conditions, to rapidly return to the normal rotation. Then, the controller 220 sequentially performs the stop mode or initial driving mode, thereby stably maintaining the disk rotation.

Figure 3:
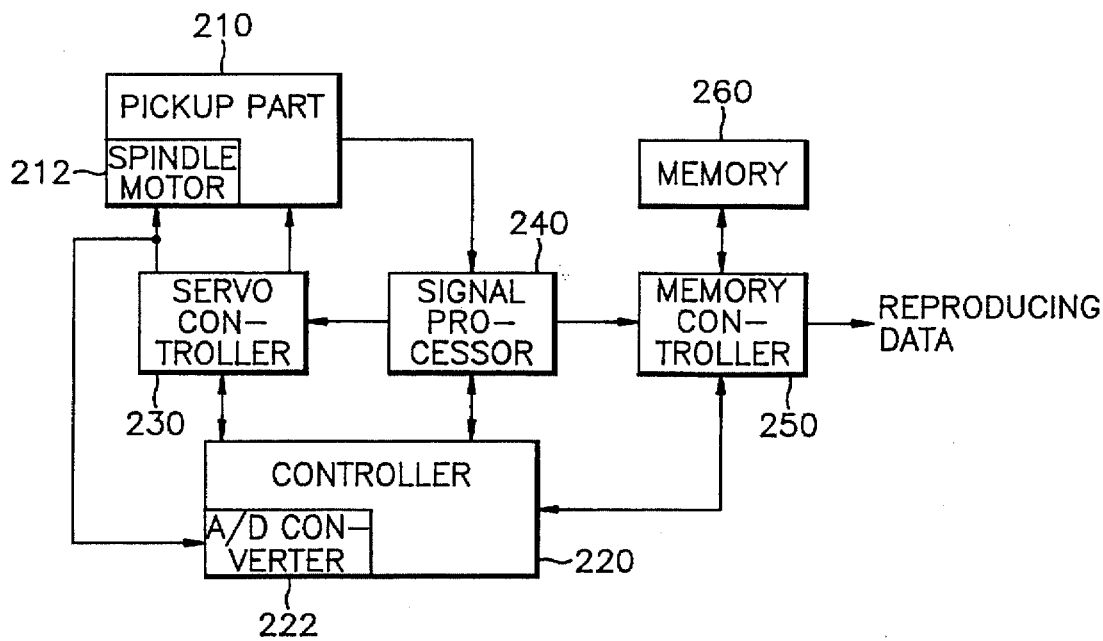
FIG. 3 is a block diagram illustrating a configuration of another embodiment of a disk rotation control apparatus according to the present invention.

Another embodiment for the above-described disk rotation control method is shown in FIG. 3. Compared with the construction of FIG. 2, that of FIG. 3 further has a memory controller 250 and a memory 260. The memory controller 250 is connected to the signal processor 240, and applies recording data to the signal processor 240 or receives the reproducing data outputted from the signal processor 240. The memory 260 stores by a predetermined frame unit the data output from the signal processor 240 and outputs the stored data, under the control of the memory controller 250.

In the normal mode the controller 220 controls the disk rotation state as shown in the embodiment of FIG. 2. The memory controller 250 stores data by the frame unit in the memory 260 and simultaneously outputs delayed data corresponding to a frame period. If in the normal mode the spindle motor 212 is rotated abnormally due to generation of an abnormal condition of the spindle motor 212, the controller 220 informs the memory controller 250 of this abnormal state and simultaneously controls the disk rotation in the same way as FIG. 5. At this time, the memory controller 250 reads and outputs data previously stored in the memory 260. Even if the disk in the normal mode therefore rotates abnormally, the memory controller 250 outputs data stored in a previous state. And if the disk rotation enters the normal rotation range, the controller 220 informs the memory controller 250 of the entrance of the normal rotation range, and the memory controller 250 stores data outputted from the signal processor 240 in the memory 260.

As earlier discussed, the disk rotation control method according to the present invention first analyzes the disk rotation state and determines the normal or abnormal state from the analyzed results. If the abnormal state is generated, a normal state can be achieved solved by performing rotation control corresponding to the generated abnormal state. The reliability of reproduction of data can thereby be improved.

What is claimed is:

1. A disk driving apparatus for controlling rotation of a disk in a normal mode, comprising:

spindle motor means for driving the rotation of said disk according to a spindle control signal;

servo control means for generating said spindle control signal of said spindle motor according to a servo control signal;

means for converting said spindle control signal into digital data;

means for storing a rotation range data table of said spindle control signal corresponding to an abnormal rotation of said disk; and controller means for comparing and analyzing the converted digital data with said rotation range data table, sensing normal and abnormal states based on a result of the comparing and analyzing, and generating a control signal which causes said servo control means to generate said servo control signal from the sensed results, wherein upon sensing the abnormal state said controller means causes said servo control means to generate said servo control signal which causes said spindle motor means to apply a torque which opposes a rotation direction of said spindle motor means during a predetermined time, and which immediately after the predetermined time has elapsed causes said spindle motor means to sequentially perform a stop mode and a normal driving mode.

2. The disk driving apparatus as claimed in claim 1, wherein, upon sensing an abnormal forward rotation of said spindle motor means, the control signal generated by said controller means results in the torque which is applied by said spindle motor means during the predetermined time to be a reverse torque having an effect of opposing the rotation direction of said spindle motor means, and upon sensing an abnormal reverse rotation of said spindle motor, the control signal generated by said controller means results in the torque which is applied by said spindle motor means during the predetermined time to be a forward torque having an effect of opposing the rotation direction of said spindle motor means.

3. A disk driving apparatus comprising:

pickup means for converting data recorded on a disk into an electrical signal according to a pickup control signal;

spindle motor means for driving said disk in a rotation direction by a spindle control signal;

servo control means for generating said spindle control signal of said spindle motor and said pickup control signal of said pickup means by a servo control signal;

means for converting said spindle control signal into digital data;

means for storing a rotation range data table of said spindle control signal corresponding to an abnormal rotation of said disk;

controller means for comparing and analyzing the converted digital data with said rotation range data table, sensing normal and abnormal states based on a result of the comparing and analyzing, and generating a control signal which causes said servo control means to generate said servo control signal from the sensed results, wherein upon sensing the abnormal state said controller means causes said servo control means to generate said servo control signal which causes said spindle motor means to apply a torque which opposes a rotation direction of said spindle motor means during a predetermined time, and which immediately after the predetermined time has elapsed causes said spindle motor means to sequentially perform a stop mode and a normal driving mode signal processing means for processing said electrical signal outputted from said pickup means to a digital signal and for reproducing the digital signal into an original data; and memory means for storing the reproduced data by a predetermined frame unit and outputting the reproduced data under a control of said controller means, said controller means outputting data stored in a previous state upon sensing an abnormal state signal.

4. The disk driving apparatus as claimed in claim 3, wherein, upon sensing an abnormal forward rotation of said spindle motor means, the control signal generated by said controller means results in the torque which is applied by said spindle motor means during the predetermined time to be a reverse torque having the effect of opposing the rotation direction of said spindle motor means, and upon sensing an abnormal reverse rotation of said spindle motor, the control signal generated by said controller means results in the torque which is applied by said spindle motor means during the predetermined time to be a forward torque having the effect opposing the rotation direction of said spindle motor means.

5. A disk rotation control method of a disk driving apparatus having a rotation/voltage table corresponding to a driving voltage of a spindle motor, comprising the steps of:

comparing and analyzing said driving voltage of said spindle motor and values of said rotation/voltage table, during a normal mode;

applying a torque by said spindle motor which opposes a rotation direction of said spindle motor for a predetermined time when the analyzed result corresponds to an abnormal rotation range;

performing a stop mode immediately after the applying step is finished; and performing said normal mode again immediately after the performance of said stop mode.

6. The disk rotation control method of the disk driving apparatus as claimed in claim 5, wherein said applying step further includes the steps of:

performing a first brake mode, wherein the torque which is applied by said spindle motor during the predetermined time is a reverse torque which opposes a rotation direction of said spindle motor when an abnormal forward rotation of said spindle motor is sensed in the analyzing step; and performing a second brake mode, wherein the torque which is applied by said spindle motor during the predetermined time is a forward torque which opposes the rotation direction of said spindle motor when an abnormal reverse rotation of said spindle motor is sensed in the analyzing step.

7. A disk rotation control method of a disk driving apparatus having a rotation/voltage table corresponding to a driving voltage of a spindle motor, comprising the steps of:

locking a phase lock wherein the driving voltage remains within an intermediate voltage range suitable for performing a normal mode operation;

performing said normal mode operation after locking of said phase lock;

checking whether a locking state of said phase lock is maintained in said normal mode;

comparing and analyzing said driving voltage of said spindle motor and values of said rotation/voltage table, during said normal mode;

performing a first brake mode operation by applying torque which opposes a rotation direction of said spindle motor for a predetermined time when the analyzed result corresponds to an abnormal rotation range, and then immediately performing a stop operation;

performing a second brake mode operation by causing said spindle motor to apply torque which opposes the rotation direction of said spindle motor during said predetermined time, upon input of a stop command during said normal mode and then immediately performing the stop operation; and performing said normal mode again after the performance of said stop operation.

8. The disk rotation control method as claimed in claim 7, wherein the torque applied by said spindle motor while performing the first brake mode operation is a reverse torque which opposes the rotation direction of said spindle motor when an abnormal forward rotation of said spindle motor is sensed in the analyzing step, and the torque applied by said spindle motor while performing the first brake mode operation is a forward torque which opposes the rotation direction of said spindle motor when an abnormal reverse rotation of said spindle motor is sensed in the analyzing step.

9. The disk rotation control method as claimed in claim 8, wherein said checking step further includes steps of:

checking whether a duration of an unlocked state in which the driving voltage is not maintained within the intermediate voltage range suitable for the normal mode operation exceeds a predetermined time;

sequentially performing a rough servo operation and said normal mode when the duration of said unlocked state does not exceed said predetermined time;

proceeding to said comparing and analyzing step if said unlocked state exceeds said predetermined time; and performing a phase and velocity control operation when said phase lock is in a locking state.

\* \* \* \* \*